United States Patent [19]

Elder

[11] 4,242,809
[45] Jan. 6, 1981

[54] METHOD AND APPARATUS FOR PRESERVING PROTEIN IN ANIMAL DROPPINGS

[76] Inventor: Joseph T. Elder, Box 21, Lakeview, Ohio 43331

[21] Appl. No.: 748,651

[22] Filed: Dec. 8, 1976

[51] Int. Cl.³ .................................................. F26B 3/04
[52] U.S. Cl. ............................................ 34/33; 34/166;
34/171; 119/22; 71/9
[58] Field of Search ................... 119/22; 23/259.1;
71/21, 9; 34/166, 167, 168, 33, 171, 172;
259/99, 107, 43, 8; 366/290, 291

[56] References Cited

U.S. PATENT DOCUMENTS

| | | | |
|---|---|---|---|
| 2,639,902 | 5/1953 | Kuebler | 71/9 |
| 2,878,112 | 3/1959 | Morrison | 71/9 |
| 3,312,194 | 4/1967 | Ernst | 119/22 |
| 3,756,784 | 9/1973 | Pittwood | 71/9 |
| 3,941,091 | 3/1976 | Fleshman | 119/22 |

*Primary Examiner*—Larry I. Schwartz
*Attorney, Agent, or Firm*—William Preston Hickey

[57] ABSTRACT

A method and apparatus for collecting and drying animal droppings at room temperature to substantially prevent the decomposition of the protein and urea therein. The droppings are collected on boards positioned beneath cages for the animals, and air at ambient temperature is forced over the droppings. The dried droppings are periodically turned and removed by raking apparatus which moves over the boards and either forces the droppings down tubular means to a conveyor below or sucks the droppings from the boards with vacuum.

15 Claims, 9 Drawing Figures

METHOD AND APPARATUS FOR PRESERVING PROTEIN IN ANIMAL DROPPINGS

BACKGROUND OF THE INVENTION

The present invention relates to a method of housing animals and handling their droppings whereby a maximum of the protein therein is preserved in a form acceptable for recycling as an animal food.

Some animals and particularly domestic fowl, as for example, chickens, can be fed a high protein diet for the purpose of causing the animal to speed up the process of converting the food to animal protein in the form of either body weight, eggs, milk, etc. In the case of egg producing chickens, for example, the chickens are fed a ration of at least approximately 18 percent protein to stimulate and maintain egg production at a maximum. The digestive tract of the chicken cannot remove all of the protein from the food, and approximately half of the protein fed to the chicken is excreted in the droppings. In the digestive tract, the food is worked upon by a combination of chemicals, enzymes, and bacteria which convert some of the protein into a liquid form capable of passing through the membranes of the digestive tract to be absorbed by the blood of the chicken. As in all chemical processes, a driving force must exist across a membrane in order to cause molecules to migrate through the membrane; and in the present instance, the driving force is provided by a higher concentration of protein in the digestive tract than exists in the blood stream of the chicken. The digestive tract therefore must carry a higher protein level than the level of protein in the blood of the animal. The excrement from the digestive tract therefore carries a particular concentration of digested protein in the absorbable liquid form. In addition, the excrement from the digestive tract will carry protein in solid undigested form. The result is that the droppings of all chickens and all other animals contain a sizable percentage of the protein that was fed to the animal.

The excrement, or droppings, are warm and moist, and are an ideal culture for all kinds of bacteria which immediately start decomposition of the remaining protein in the droppings after leaving the body of the animal. Some bacteria exists in the digestive tract of the animal and are in the droppings when excreted. Such bacteria are usually of a beneficial kind. Other bacteria are carried in the air, and in stale droppings, and such bacteria are usually the major source of putrifaction of the protein in the droppings.

An object of the present invention is the provision of a new and improved method of housing animals and handling their droppings, so that putrifaction of the protein in the droppings is substantially prevented so that the droppings can be used as a food supplement for recycling with other protein in the food for the animals.

Another object of the invention is the provision of new and improved apparatus for collecting and processing animal droppings which will preserve a maximum amount of the protein in the droppings.

Other objects and advantages of the invention will become apparent to those skilled in the art to which the invention relates from the following description of the preferred embodiments which are described with reference to the accompanying drawings forming a part of this specification.

DESCRIPTION OF THE PREFERRED EMBODIMENTS

According to principles of the present invention, the protein level in animal droppings, and particularly in poultry droppings, is kept at a maximum level and in a form suitable for recycling as a food to animals, by drying the droppings immediately on excrement at room temperature using a forced flow of ambient air. By removing the moisture from the droppings quickly, substantially all growth of bacteria is stopped, or prevented. Such a process is carried out immediately on excrement, and in the presence of the animals. In prior art waste removal and drying processes, the droppings are collected periodically and are transported considerable distances to high temperature driers. According to principles of the present invention, it has been discovered that putrefaction starts during the collection and transporting to the drier, and that further decomposition of the protein occurs in driers which are operated at elevated temperatures.

According to further principles of the invention, drying immediately on excrement at room temperature avoids decomposition of the protein, and retains much of the urea that is driven off in high temperature driers, and which urea according to the invention can be recycled and used with added protein as food for the animals.

In the preferred embodiments of the invention, the droppings which are subjected to a forced air flow at ambient temperatures are stirred periodically. In the most preferred embodiments the droppings are collected on top of a layer of already dried droppings which quickly absorb moisture out of the fresh droppings to keep the fresh droppings from sticking to other surfaces, and to increase the area for evaporation of moisture to the air flow.

Figure 1:
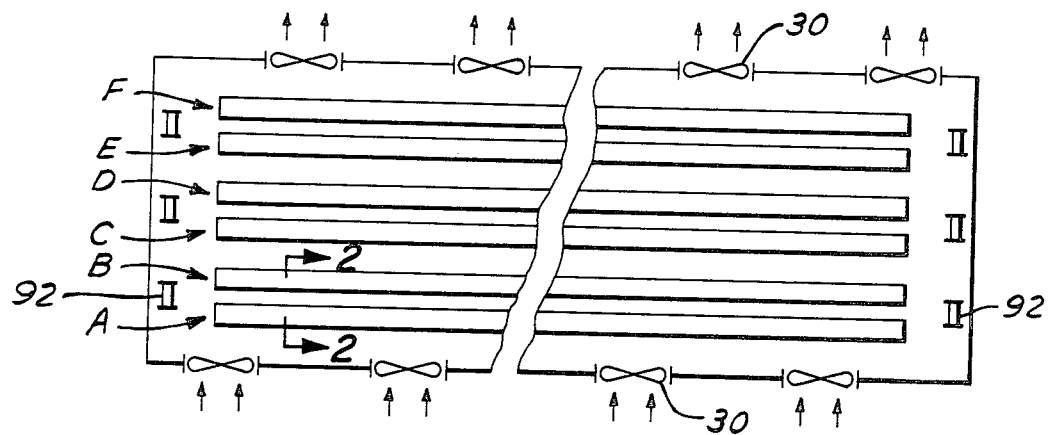
FIG. 1 is a schematic layout of an egg producing facility embodying the principles of the present invention.
Figure 2:
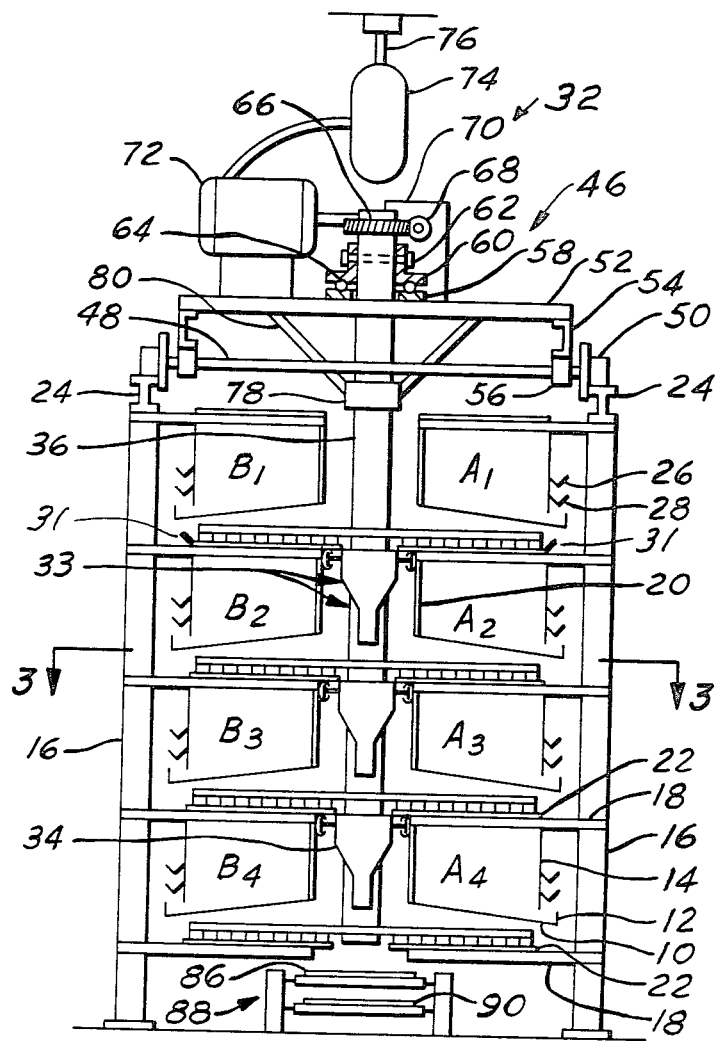
FIG. 2 is a sectional view taken approximately on the line 2—2 of FIG. 1.

FIG. 1 is a plan layout of a building for housing laying chickens, and for collecting their droppings in a manner utilizing principles of the present invention. FIG. 2 of the drawings is a sectional view through one of three identical arrangements for individually confining the laying chickens and for collecting and drying their droppings. The apparatus shown in FIG. 2 comprises two rows of vertically spaced apart tiers of wire cages with the rows being arranged back to back with clearance therebetween, and with structure positioned between the rows for removing the droppings. The rows of cages are designated by the letters A, B, C, D, E, and F with the individual tiers in each row being further designated by the suffices 1, 2, 3 and 4 proceeding from top to bottom. All of the tiers of cages are identical, and have sloping wire bottoms 10 for retaining eggs and causing them to roll forwardly to a ledge 12 that is positioned outwardly of the front face of the cage from which position they can be easily gathered. The cages are hung from stanchions 16 having legs positioned forwardly of the front face 14 of the cages by means of horizontal stanchion arms 18 which extend through suitable openings in the front 14 and back 20 of the cages. The top of each tier of cages is formed from abutting ¼ inch plywood boards to which the fronts 14 and backs 20 are attached. The plywood boards 22 rest upon the lateral stanchion arms 18 to support the cages. Adjacent rows of cages and stanchions are identical, but are positioned back to back with the tops of the stanchions 16 being tied together by longitudinally extending rails 24. Beneath the bottom tier of cages is another row of lateral stanchion arms 18 and boards 22 that are identical with those previously described, excepting that no cage structures are fastened thereto. A V-shaped watering trough 26, and a V-shaped food trough 28 are spaced vertically along the front face of each tier of cages, and the droppings from the birds fall through the sloping wire bottoms 10 to fall upon the board 22 forming the top of the tier of cages beneath.

The droppings on the boards 22 are dried by a steady flow of room temperature air that is forced over the boards to carry away the moisture. The forced flow of ambient air can be provided in various ways, and as shown in FIG. 1 is provided by forced air fans 30 located in the outside walls of the building generally opposite to the cage structures. The fans may either blow in or blow out. In order to minimize forces on the building, an arrangement can be utilized wherein fans in one wall force air in, while fans in the opposite wall of the building force air out. With this arrangement the pressure in the building will be approximately the same as the pressure outside of the building. The air flows across the building and over the dropping boards 22 in a gentle manner. A short inclined wind board 31 may be installed along the outer edge of each dropping board to produce a general rolling or swirling action to the air as it passes over the board to thereby increase the rate of drying of the droppings. The wind boards preferably extend upwardly and outwardly at approximately a 45 degree angle to the boards 22 and need only be approximately three inches long.

Figure 3:
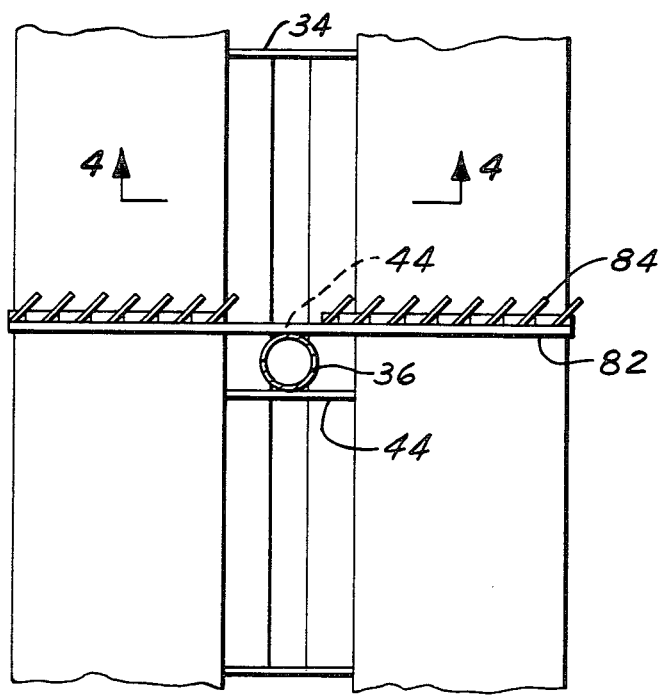
FIG. 3 is a fragmentary sectional view taken approximately on the line 3—3 of FIG. 2.
Figure 4:
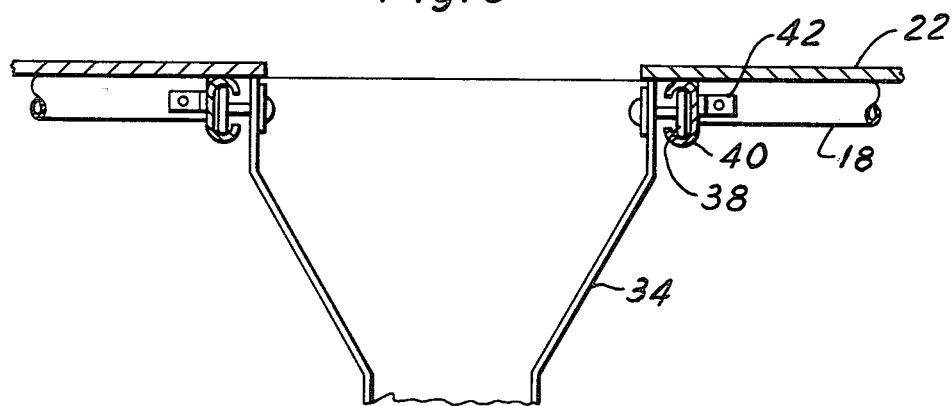
FIG. 4 is a fragmentary sectional view taken approximately on the line 4—4 of FIG. 3.

The droppings after being dried, are removed from the boards 22 by means of a tower structure 32 that is positioned between the backs of the rows of cages and which comprises tubular means 33 for conducting the droppings to other conveying means. In the embodiment shown in FIGS. 1 through 4 of the drawings, the tubular means 33 comprises four tiers of funnels 34 and a rotatable vertical shaft 36 which passes downwardly through the funnels 34. As best seen in FIG. 4, the funnels 34 are supported by rollers 38 that are fixed to its opposite side edges and are received in C-shaped tracks 40 which are in turn fixed to the ends of the lateral stanchion arms 18 by means of angle brackets 42. The upper ends of the funnels 34 are positioned beneath the rear portions of the boards 22, so that droppings that are forced off of the boards 22 fall down into the funnels 34. As best seen in FIG. 3 of the drawings, the rotatable shaft 36 passes downwardly through the tiers of funnels 34. Each funnel 34 is provided with a pair of cross braces 44 which abut opposite sides of the vertical shaft 36, so that longitudinal movement of the vertical shaft is imparted to each of the funnels 34.

The top end of the vertical shaft 36 is hung from an over head movable platform or carriage 46 that is supported from a pair of axles 48 having flanged wheels 50 that roll along the tops of the rails 24. The carriage 46 comprises a metal deck 52 the opposite side edges of which are supported on channels 54 that sit upon pillow blocks 56 which journal the axles 48. An annular bearing plate 58 surrounds the upper end of the vertical shaft 36 and bears against the top of the metal deck 52. A second annular bearing plate 60 surrounds the shaft 36 upwardly of the annular bearing plate 58 and is suitable fixed to the shaft 36 as by a through-bolt 62. Ball bearings 64 are positioned between the bearing plates to complete the bearing structure. A worm ring gear 66 is secured to the shaft 36 upwardly of the bearing structure, and the ring gear 66 is in turn driven by a worm gear 68 that is rotatable driven by a gear reduction unit 70 and electric motor 72. The power supply cable for the electric motor 72 passes through a recoil structure 74 and the supply end of the cord 76 is fixed generally midway of the building for reasons which will later be explained. A brass sleeve bearing 78 surrounds the vertical shaft 36 beneath the metal deck 52, and the sleeve bearing 78 is braced in four directions from the metal deck 52 by angle brackets 80.

Rotation of the vertical shaft 36 is utilized to cultivate droppings on the boards 22 and to rake some of the droppings from the boards into the collection funnels 34. Laterally extending arms 82 are fastened to the shaft 36 approximately three inches above the boards 22, and a plurality of raking plates 84 depend from the laterally extending arms to within approximately one inch of the boards 22. As best seen in FIG. 3, the arms 82 are made from a section of angle iron that is fastened to the shaft 36 with its horizontal leg forming the upper edge of the arm. Spacer blocks beveled at 45 degrees are positioned at spaced apart intervals beneath the horizontal leg of the angle iron arms 82 and raking plates approximately six inches long abut the spacer blocks and are fastened to the vertical legs of the angle iron arms by means of through-bolts. Upon rotation of the shaft 36, the arms 82 swing over the boards 22 to cause the raking plates 84 to cultivate the top layer of the droppings on the boards 22, and at the same time move them in the direction of the back of the boards where some of the droppings fall into the funnels 34. The dried droppings from one funnel fall downwardly into the funnel beneath; and the material from the bottom funnel falls onto the flight 86 of a belt conveyor 88 that is positioned in the space beneath the backs of the bottom rows of cages. The conveyor 88 receives the droppings from the funnels, and moves them to one end of the building where another conveyor, not shown, gathers the dried droppings from each of the three pairs of cage structures and moves them to the feed mixing equipment that supplies the feed mixture for the birds.

The tower structure 32 which comprises the funnels 34, shaft 36, and supporting carriage 46 is moved longitudinally of the rows of cages by means of a pair of electric motor driven winches 92 that are affixed to either end of the building. Cables connect the respective winches to the respective ends of the carriage 46; and when it is desired to move the carriage in one direction, the driving motor for one winch 92 is energized and engaged, while the driving motor for the other winch is deenergized and disengaged. The energized motor causes its winch to retrieve cable and wind it upon its drum while the opposing winch plays out cable with a controlled amount of drag. When the carriage reaches one end of the rows of cages, it trips a limit switch which operates a pair of solonoid switches which in turn deactivates the energized motor and activates the other motor to start the carriage 46 in the reverse direction.

It will be seen that the raking plates 84 periodically cultivates the top layer of droppings on the boards 22 by loosening the layer and moving the same a short distance laterally in a manner similar to that performed by discs and drags that are used to cultivate soil. This cultivating action exposes all sides of the droppings to the flow of ambient air passing over the boards 22 to effect complete drying of the droppings without raising their temperature above that of the ambient conditions. A minimum of decomposition of the protein and/or urea in the droppings to nonusable ammonia is thereby affected.

Figure 5:
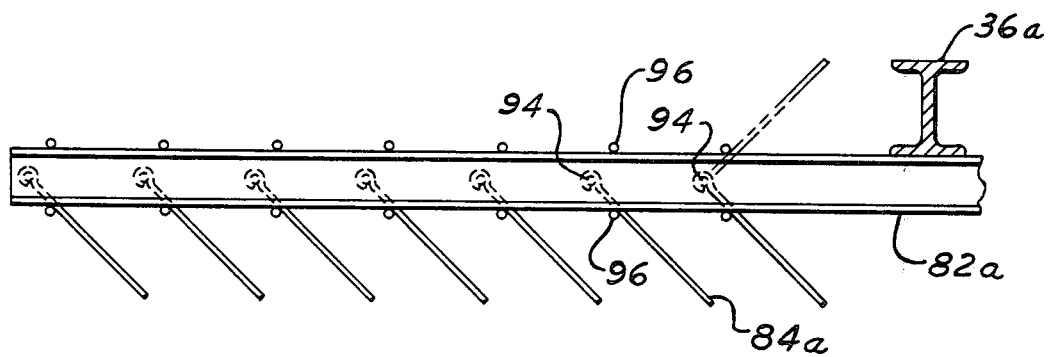
FIG. 5 is a fragmentary sectional view somewhat similar to FIG. 4 but showing the raking arms of another embodiment of the invention.

The embodiment shown in FIG. 5 is generally similar to the embodiment shown in FIGS. 1 through 4, but differs principally therefrom in that the shaft 36 is non-rotatable supported by the carriage 46; and so is made in the form of an I-beam. Those portions of the embodiment shown in FIG. 5, which are similar to corresponding portions of the embodiment shown in FIGS. 1 through 4, are designated by a like reference numeral characterized further in that a suffix "a" is affixed thereto. The lateral arms 82a are formed from channel iron instead of angle iron and the flanges of the channel iron extend upwardly. The raking plates 84a are hinged about vertical hinge pins 94 that are fixed to the webs of the channels 82a. The raking plates are limited in their swinging movement by depending stops 96 that are welded to the flanges of the channels 82a to prevent the raking plates from moving past center and hold the plates in angular positions with their trailing edges extending angularly toward the funnels 34. The arms 82a instead of being rotated are pulled longitudinally by the carriage 46a with the raking plates extending rearwardly of the trailing edge of the arms 82a at an angle designed to move the top layer of droppings toward and into the collection funnels 34a. When movement of the carriage 46a is reversed, the plates 84a swing about the hinge pins 94 until they abut the stops 96 on the opposite flange of the channels 82a. In this new position, the opposite sides of the raking plates 84a engage the droppings to again move the droppings toward the collection funnels 34a. The construction shown in FIG. 5 therefore, does not require the shaft 36a to rotate, so that the motor 72 and gear structure 66 through 70 is not required.

Figure 6:
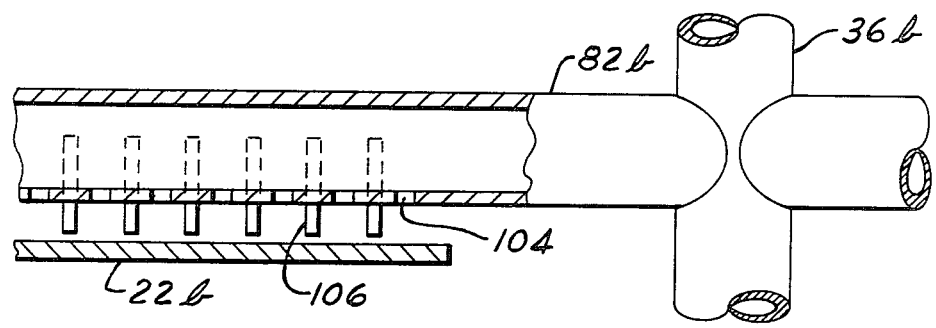
FIG. 6 is a fragmentary sectional view in elevation showing the raking arms of still another embodiment of the invention.
Figure 7:
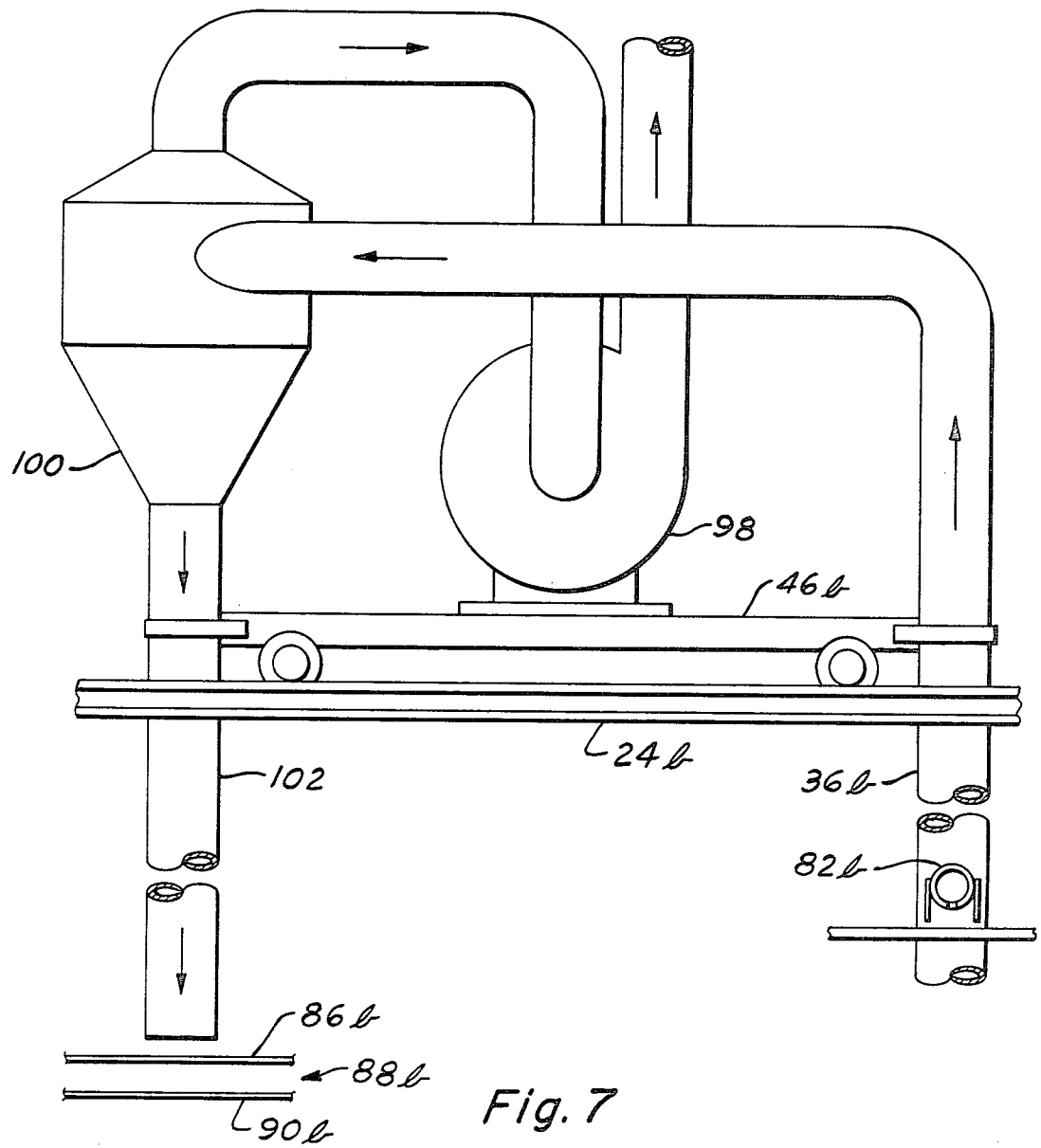
FIG. 7 is a schematic fragmentary elevational view showing the dropping removal tower structure of the embodiment shown in FIG. 6.

In the embodiment shown in FIGS. 6 and 7, vacuum is utilized to suck up the top layer of droppings on the boards and deposit them on the collection conveyor. Those portions of the embodiment shown in FIGS. 6 and 7 which are similar to corresponding portions of the embodiments previously described are designated by a like reference numeral characterized further in that a suffix "b" is affixed thereto. The lateral arms 82b are tubular conduits, as is the vertical shaft 36b, and vacuum is supplied to the top of the vertical shaft 36b by means of a fan 98 that is mounted on the carriage 46b. The motor for the fan is supplied with electricity using a cable recoil structure 74b, not shown. The fan 98 takes suction from the top outlet of a cyclone separator 100. The tagential inlet of the separator 100 is connected to the top of the vertical shaft 36b. Solids from the cyclone separator drop out of the bottom of the separator and fall down the discharge tube 102 onto the top flight 86b of the discharge conveyor 88b.

As previously indicated, the lateral arms 82b are tubular and each is provided with spaced apart openings in the portion of its bottom surface whch overlies the boards 22b. A plurality of raking pins 106 are welded to the edges of the arms 82b intermediate the openings 104. The raking pins 106 extend to within a short distance of the boards 22b. The pins 106 cultivate and loosen the top layer of droppings, and move the layer into ridges that are in line with the openings 104. Thereafter vacuum sucks up the droppings which form the ridges, and carries them away with the flow of air that proceeds upwardly through the shaft 36b to the cyclone separator 100. In the cyclone separator the solids fall down the discharge tube 102 and are deposited onto the top flight of the discharge conveyor 88b.

Figure 8:
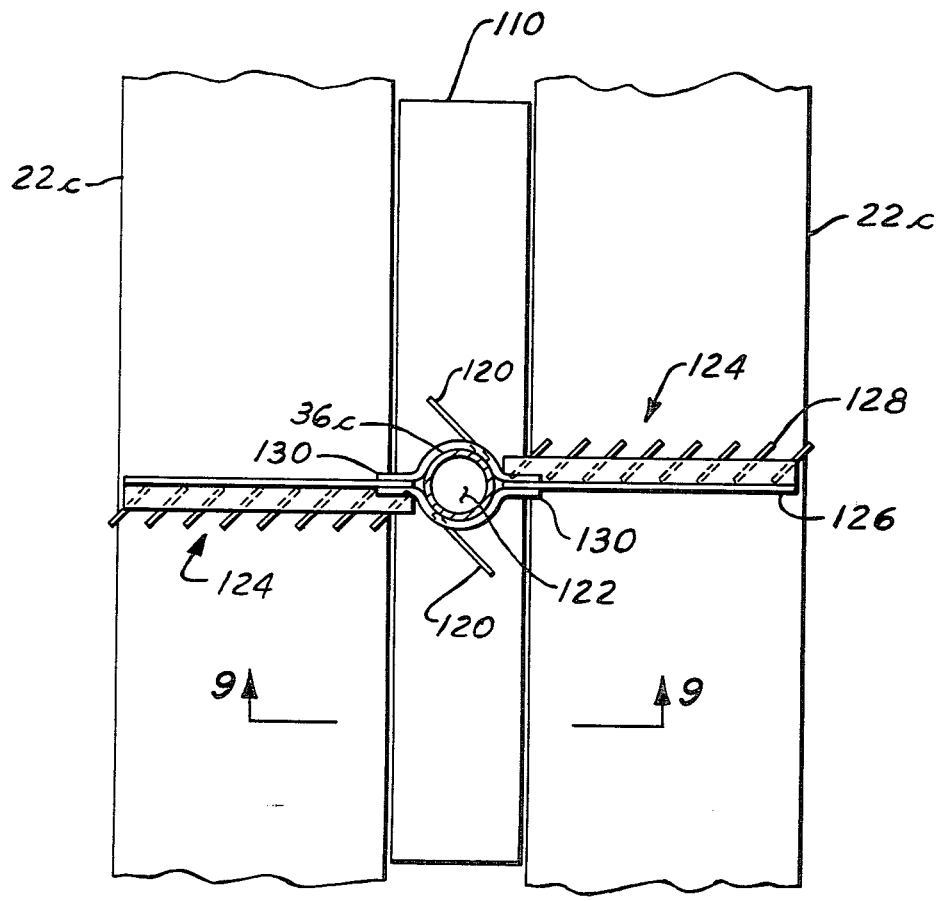
FIG. 8 is a fragmentary sectional view similar to FIG. 3 but showing another embodiment wherein the droppings fall down the inside of the vertical tubular drive shaft for the rake arms and the funnels seen in FIGS. 2, 3 and 4 are eliminated.
Figure 9:
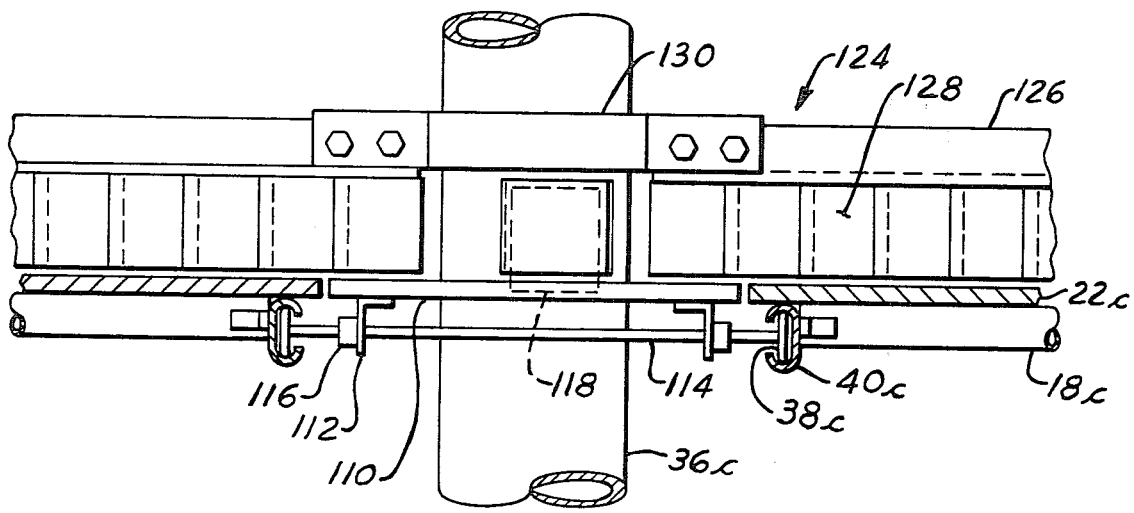
FIG. 9 is a fragmentary sectional view taken approximately on the line 9—9 of FIG. 8.

The embodiment shown in FIGS. 8 and 9 of the drawings is generally similar to the embodiment shown in FIGS. 1 through 4, but differs principally therefrom in that the tubular means for conducting the droppings down onto the take-away conveyor is the tubular power shaft used to rake droppings off of the dropping boards, so that funnels are no longer required. Those portions of the embodiment shown in FIGS. 8 and 9 which are similar to corresponding portions of the embodiment shown in FIGS. 1 through 4 are designated by a like reference numeral, characterized further in that a suffix "c" is affixed thereto.

In the embodiment shown in FIGS. 8 and 9 a movable platform 110 surrounds the rotatable vertical shaft 36c, and bridges the space between adjacent dropping boards 22c. The movable platform 110 has a pair of longitudinally extending angle irons 112 fixed to its bottom side with their depending legs positioned adjacent respective side edges of the platform. A pair of axle rods 114, one at each end of the platform, extend through aligned openings in the angle irons, and a roller 38c is fastened to each end of each axle rod. The rollers 38c are received in tracks 40c as explained above for the embodiment shown in FIGS. 1 through 4. Collars 116 are positioned against the angle irons and are fastened to the axles by set screws, not shown, to limit side movement of the movable platform 110.

A pair of rectangular openings 118 are provided in tubular shaft 36c with the lowermost portion of the openings 118 being at or slightly below the top surface of the movable platform 110. The shaft 36c is intended to rotate counterclockwise as seen in FIG. 8, and a pair of scoops 120 project from the shaft 36c to scrape droppings from the movable platform 110 and deflect them into the central cavity 122 of the tubular shaft 36c. The scoops 120 are made by welding the rear edge of a plate to the shaft 36c at the trailing edge of each opening 118 and with the plate extending outwardly generally tangent to the shaft 36c.

Droppings are scraped from the dropping boards 22c to the movable platform 110 by a pair of rake arms 124. Each rake comprises an angle iron 126 having rake or deflector plates 128 tack welded to the horizontal leg of the angle iron 126 at a 45 degree angle to its vertical leg. The vertical leg of the angle is bolted between halves of a clamp 130 that attaches the arms 124 to the shaft 36c in such manner that the height of the arms can be varied with respect to the boards 22c. Rotation of the shaft 36c causes the deflector plates 128 to move droppings inwardly toward the movable platform 110 by the radial extent of the plates 128 with each contact until the droppings are moved onto the movable platform adjacent the shaft 36c. Thereafter the deflector plates 120 scoop the droppings into the openings 118 of the tubular shaft where they fall down its central cavity 122 to the conveyor 86c.

In all of the embodiments previously described, fresh droppings fall upon a cultivated layer of already dried droppings which absorb moisture from the fresh droppings and increase the area that is exposed to the flow of ambient air. The droppings are quickly cooled to room temperature. Drying is accomplished at room temperature, so that decomposition of protein and urea in the droppings is substantially prevented, and so that growth of bacteria in the droppings is also prevented.

While the invention has been described in considerable detail, I do not wish to be limited to the particular embodiments shown and described; and it is my intention to cover hereby all novel adaptations, modifications, and arrangements thereof which come within the practice of those skilled in the art to which the invention relates.

I claim:

1. A method of handling animal droppings to retain protein therein comprising: collecting fresh animal droppings on a generally horizontal collection surface, forcing a flow of room temperature air over droppings on said surface to effectively dry droppings thereon, periodically agitating the droppings on the collection surface to expose all surfaces of the droppings to said forced flow of air to dry the droppings on said collection surface substantially to a nonbacteria growing state, and periodically removing dried droppings from said collection surface.

2. The method of claim 1 wherein dried droppings are left on the surface and the fresh droppings are collected on said dried droppings, and whereby the dried droppings help to quickly absorb moisture from the fresh droppings and provide a larger exposed surface to said forced flow of air.

3. Animal housing and waste removal apparatus comprising: a building having generally parallel opposing outside walls, first and second spaced apart rows of vertically spaced apart tiers of animal cages extending generally parallel to said outside walls, first and second spaced apart rows of vertically spaced apart tiers of dropping boards with the respective tiers of dropping boards being positioned beneath respective tiers of cages with working clearance between respective dropping boards and cages, supply fans in one of said outside walls and exhaust fans in the opposite outside wall for producing forced circulation of air laterally over said dropping boards in an amount to thoroughly dry the dropping on said dropping boards, and means for removing dried droppings from said dropping boards.

4. Animal housing and waste removal apparatus comprising: first and second spaced apart rows of vertically spaced apart tiers of animal cages, first and second spaced apart rows of vertically spaced apart tiers of dropping boards, with the respective tiers of dropping boards being positioned beneath respective tiers of cages with working clearance between respective dropping boards and cages, means for producing forced circulation of air laterally over said dropping boards, a dropping removal tower positioned in the space between said first and second rows of dropping boards and cages, means for moving said tower longitudinally of said rows, means for stirring and moving droppings on said dropping boards laterally in stages with sufficient time between stages to dry exposed surfaces of the droppings, and means for collecting the dried droppings from said dropping boards.

5. The apparatus of claim 4 wherein said tower comprises a rotatable shaft and said means for stirring and moving droppings comprises lateral arms on said rotatable shaft, said lateral arms having depending angular blades which engage the droppings and move them to the tower.

6. The apparatus of claim 4 wherein said means for stirring and moving droppings comprises laterally extending arms carried by said tower, said arms having depending dropping contacting blades, said blades being swingable about a vertical axis, and stop means for limiting swinging movement of said blades between angular positions which trail said arms and deflect droppings toward said tower.

7. The apparatus of claim 9 wherein said tower comprises an overhead supporting platform and a vertical vacuum shaft to which said tubular arms communicate, a cyclone separator on said supporting platform into which said vacuum shaft discharges, a fan taking suction on said cyclone separator, and said means for collecting droppings communicates with the bottom of said cyclone separator.

8. The apparatus of claim 7 wherein said last mentioned means comprises: a belt conveyor extending lengthwise of said cages beneath said bottom tier of cages, and a drop shaft discharging said cyclone separator onto said belt conveyor.

9. Animal housing and waste removal apparatus comprising: first and second spaced apart rows of vertically spaced apart tiers of animal cages, first and second spaced apart rows of vertically spaced apart tiers of dropping boards, with the respective tiers of dropping boards being positioned beneath respective tiers of cages with working clearance between respective dropping boards and cages, means for producing forced circulation of air over said dropping boards, a dropping removal tower positioned in the space between said first and second rows of dropping boards and cages, means for moving said tower longitudinally of said rows, and means for stirring droppings and moving the droppings to said tower comprising tubular arms to which vacuum is communicated, said arms having nozzle means thereon for sucking droppings from said dropping boards into said arms.

10. Animal housing and waste removal apparatus comprising: first and second spaced apart rows of vertically spaced apart tiers of animal cages, first and second spaced apart rows of vertically spaced apart tiers of dropping boards, with the respective tiers of dropping boards being positioned beneath respective tiers of cages with working clearance between respective dropping boards and cages, a dropping removal tower positioned in the space between said first and second rows of dropping boards and cages, means for moving said tower longitudinally of said rows, a vertical tubular shaft carried by said tower generally centered between tiers of said first and second rows, means for rotating said tubular shaft, said shaft having openings therein generally opposite said dropping boards, and means carried by said tubular shaft for moving droppings from said dropping boards into said openings upon rotation of said shaft.

11. Animal housing and waste removal apparatus comprising: first and second spaced apart rows of vertically spaced apart tiers of animal cages, first and second spaced apart rows of vertically spaced apart tiers of dropping boards, with the respective tiers of dropping boards being positioned beneath respective tiers of cages with working clearance between respective dropping boards and cages, support columns extending vertically on opposite sides of the space between said first and second rows, said first and second tiers of cages being supported by said support columns, parallel rails carried by said columns above the upper most tier of cages in said first and second rows, a carriage mounted on said rails, said carriage having vertically extending means supported therefrom and extending downwardly between said tiers of said first and second rows for removing droppings from said dropping boards of said first and second rows, and conveyor means positioned beneath the bottom tier of cages for removing droppings from said vertically extending means.

12. The structure of claim 11 wherein said vertically extending means comprises funnels positioned below the dropping boards of each tier and arranged to transfer droppings sequentially to said conveyor means.

13. The structure of claim 11 wherein said vertically extending means comprises a tubular member having openings adjacent said dropping boards, and means for moving droppings from said dropping boards into said openings.

14. The structure of claim 13 wherein said last mentioned means comprises platforms generally in line with said dropping boards and scraper means for scraping droppings from said dropping boards across said platforms and into said openings.

15. The structure of claim 11 wherein said vertically extending means is rotatable, and scraper means driven by said vertically extending means and whereby droppings are scraped from said boards and moved to said conveyor means.

* * * * *